UNITED STATES PATENT OFFICE.

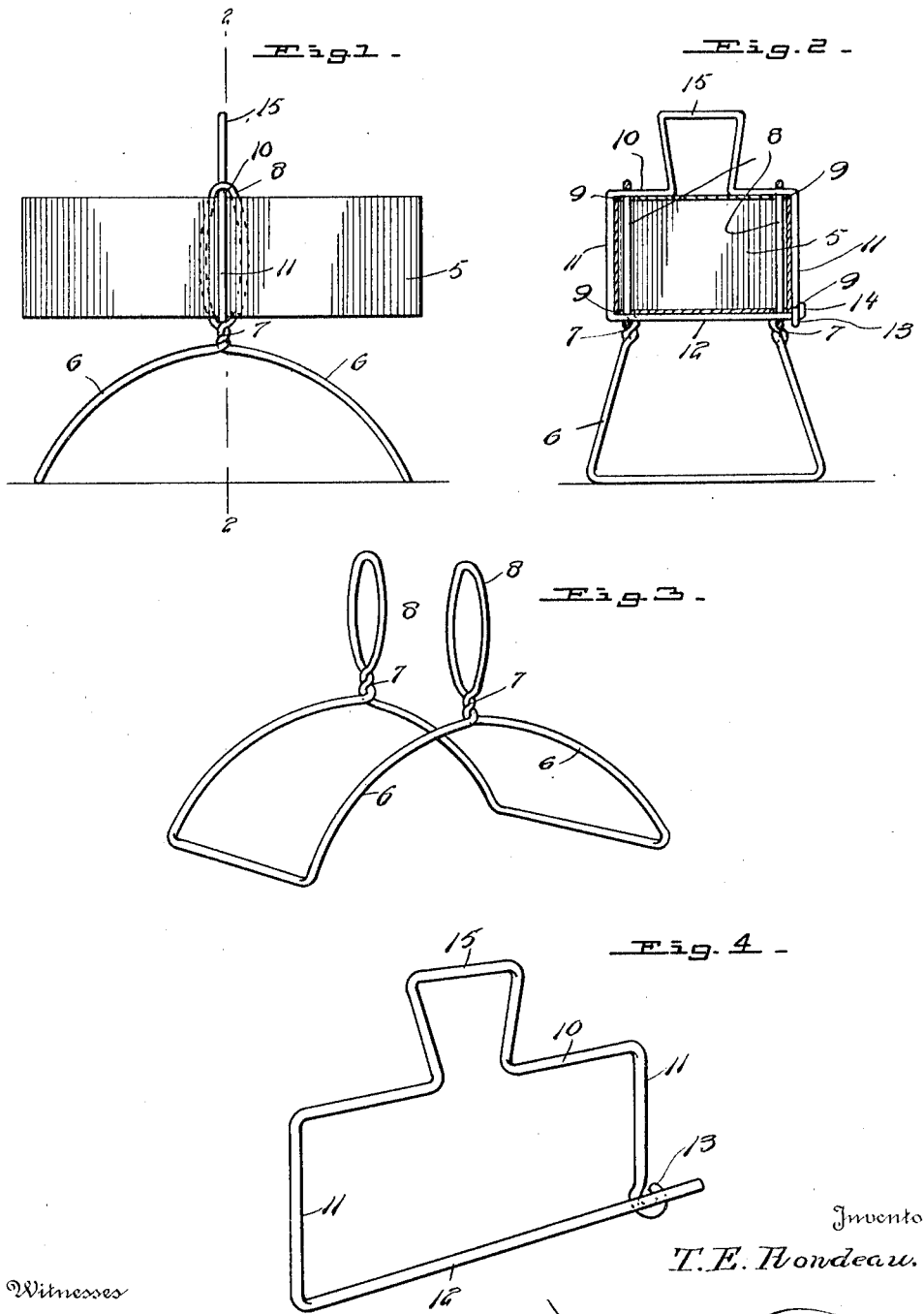

THOMAS E. RONDEAU, OF COURTRIGHT, ONTARIO, CANADA.

EGG-CRATE CUSHION.

1,117,447. Specification of Letters Patent. Patented Nov. 17, 1914.

Application filed March 11, 1914. Serial No. 824,052.

*To all whom it may concern:*

Be it known that I, THOMAS E. RONDEAU, subject of the King of England, residing at Courtright, in the Province of Ontario, Dominion of Canada, have invented certain new and useful Improvements in Egg-Crate Cushions; and I do hereby declare the following to be a full, clear, and exact description of the invention, such as will enable others skilled in the art to which it appertains to make and use the same.

This invention relates to new and useful improvements in resilient supports for articles.

The object of the present invention resides in the provision of a supporting member which may be readily secured to a receptacle, such as an egg box, and whereby the box may be moved about and placed on the ground with a minimum amount of jar or shock being transmitted to the receptacle, it being particularly the object to provide such a device for use with eggs intended for hatching, although the device may be used to support any fragile objects.

A further object of the invention resides in the provision of a supporting member of the class described which comprises a minimum number of parts so that it is light in weight and may be manufactured at a comparatively low cost.

With these and other objects in view, the invention resides in the novel combination, formation, and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a side elevation of the improved device attached to and supporting a receptacle. Fig. 2 is a transverse sectional view on the line 2—2 of Fig. 1. Fig. 3 is a perspective view of the ground engaging portion of the engine. Fig. 4 is a perspective view of that portion carried by the receptacle.

Referring now more particularly to the accompanying drawings 5 designates a conventional form of receptacle adapted to hold eggs or the like. The resilient support for this receptacle is formed preferably of two lengths of wire and comprises a spring member disposed under the receptacle and a member carried by the receptacle for securing the spring member thereto. This spring or supporting member comprises leg portions 6 each substantially U-shaped and having their arms inwardly directed and bowed vertically. The ends of the adjacent arms are coiled as at 7, and the wire extended past these coiled portions to form loops 8. These loops are extended through alining slots 9 formed in the intermediate portions of the top and bottom walls of the receptacle 5 adjacent the sides thereof. To hold the loops in this position whereby the receptacle will be properly held with relation to the supporting member a length of wire 10 is provided which extends transversely across the top of the receptacle and passes through the upper ends of the loops 8. The wire is extended at 11 down the sides of the receptacle and one of the extensions 11 is further extended transversely under the receptacle at 12 and through the lower ends of the loops 8. The free end of the other extension 11 is provided with an eye member 13 and the portion 12 is engaged in said eye member and bent as at 14 to provide a locking engagement. The intermediate portion of the wire length 10 is upwardly offset at 15 to provide a handle whereby both the receptacle and the support may be carried.

From the foregoing it is observed that I have provided a very simple and efficient structure, wherein the receptacle is given a proper resilient support and is firmly secured to said support.

What is claimed is:—

1. A support comprising the combination with a receptacle, of a pair of loops disposed adjacent the sides thereof and extending above and below the same, said loops being extended at their lower ends to form resilient supporting legs, and a loop surrounding the receptacle and passed through the top and bottom portions of the first loops.

2. A support comprising the combination with a receptacle provided in its top and bottom walls adjacent the sides with vertical alined openings, a supporting member comprising a single length of wire bent to form substantially U-shaped legs, adjacent ends of said legs being coiled and then extended to provide loops passed through the openings, and a loop surrounding the receptacle and passed through the top and bottom portions of the first loops.

In testimony whereof, I affix my signature, in the presence of two witnesses.

THOMAS E. RONDEAU.

Witnesses:
CHESTER L. BENEDICT,
MARY ROSS.

Copies of this patent may be obtained for five cents each, by addressing the "Commissioner of Patents, Washington, D. C."